Patented Nov. 14, 1922.

1,435,377

UNITED STATES PATENT OFFICE.

HUGH L. CAMPBELL, OF NASHVILLE, TENNESSEE.

ADHESIVE COMPOSITION AND METHOD OF PRODUCING THE SAME.

No Drawing.      Application filed March 2, 1921. Serial No. 449,060.

*To all whom it may concern:*

Be it known that I, HUGH L. CAMPBELL, a citizen of the United States, residing at Nashville, in the county of Davidson and State of Tennessee, have invented certain new and useful Improvements in Adhesive Compositions and Methods of Producing the Same; and I do declare the following to be a full, clear, and exact description of the invention, such as will enable others skilled in the art to which it appertains to make and use the same.

This invention relates to an improved isinglass or gelatine-like adhesive composition and the improved method of making the same.

The principal object of the invention is to provide an isin-glass or gelatine-like adhesive composition made from ingredients which are easily obtainable.

A further object of the invention is to provide an adhesive composition of this character which will have comparatively great adhesive power.

The improved composition consists of ground fish scales, ground air bladders or sounds of fish, soft water, acetic acid, either sulphuric, nitric or carbolic acid, and flour.

In preparing the composition, it is preferable to mix the ingredients in the same relative proportions as is used in the following formula for a small sized batch,—viz., two pounds of ground fish scales, one pound of ground air bladders or sounds of fish, one gallon of soft water, one ounce of acetic acid, one-half ounce of either sulphuric, nitric or carbolic acid, and a half ounce of flour.

In preparing the composition, the fish scales and air bladders are first washed well so as to remove all fatty matter. They are then allowed to dry, and when dry, they are ground. After this has been done, they are mixed together and the ground mixture of fish scales and air bladders of fish is mixed with an acid liquid composed of soft water, acetic acid and either sulphuric, nitric or carbolic acid. The resultant mixture is boiled for some time, until it becomes thick. It is then strained and while it is cooling, flour is added. The mixture is then poured into pans and allowed to stand, which will cause it to form into a jelly-like mass.

Experience has shown that by using as the acid liquid a mixture of sulphuric and acetic acid, or a mixture of nitric and acetic acid, the quality and quantity of the composition is increased and its adhesive powers are great. However, very good results may be obtained by using as the acid liquid a mixture of carbolic and acetic acid. The product obtained by using sulphuric and acetic acid forms a jelly which in time becomes hard, but when nitric and acetic acid are used, the resultant substance is in the form of a liquid and remains as such. It therefore may be used to advantage as ready mixed cement.

The residue or by-product obtained by the filtering step may be used for poultry food.

From the foregoing, it will be understood that the improved composition may be cheaply prepared, as it may be prepared from ingredients which are easily obtainable. Because of its comparatively great adhesive power, the composition may be used to advantage for numerous purposes.

What is claimed is:

1. An adhesive composition composed of ground fish scales, ground air bladders of fish, water, an acid mixture including acetic acid, and flour.

2. An adhesive composition composed of the following ingredients, namely, ground fish scales, ground air bladders of fish, water, an acid mixture including acetic acid, and flour; said ingredients being mixed together in substantially the following relative proportions, namely, one gallon of water, one and one-half ounces of the acid mixture and a small quantity of flour, to two pounds of ground fish scales and one pound of ground air bladders of fish.

3. An adhesive composition composed of ground fish scales, ground air bladders of fish, water, acetic acid, sulphuric acid, and flour.

4. An adhesive composition composed of the following ingredients, namely, ground fish scales, ground air bladders of fish, soft water, acetic acid, sulphuric acid, and flour; said ingredients being mixed together in substantially the following relative proportions, namely, one gallon of soft water, one ounce of acetic acid, one-half ounce of sulphuric acid and a small quantity of flour, to two pounds of ground fish scales and one pound of ground air bladders of fish.

In testimony whereof I have hereunto set my hand.

HUGH L. CAMPBELL.